(12) United States Patent
Daikoku et al.

(10) Patent No.: US 6,181,046 B1
(45) Date of Patent: Jan. 30, 2001

(54) DYNAMO-ELECTRIC MACHINE WITH COMMUTATOR ASSEMBLY

(75) Inventors: Akihiro Daikoku; Shigekazu Sakabe; Toshinori Tanaka; Ryuichi Ikeda; Yuji Nakahara; Kyouhei Yamamoto, all of Tokyo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/370,218

(22) Filed: Aug. 9, 1999

(30) Foreign Application Priority Data

Aug. 10, 1998 (JP) .................................................. 10-226319

(51) Int. Cl.[7] ............................. H02K 39/08; H02K 3/04
(52) U.S. Cl. ..................................... 310/236; 310/DIG. 6; 310/204; 310/206
(58) Field of Search ..................................... 310/231, 232, 310/233, 234, 235, 236, 237, DIG. 6, 204, 206

(56) References Cited

U.S. PATENT DOCUMENTS

| | | | |
|---|---|---|---|
| 3,535,776 | * 10/1970 | Luca | 29/597 |
| 4,396,850 | * 8/1983 | Herr | 310/239 |
| 4,490,637 | * 12/1984 | Van De Griend | 310/237 |
| 6,057,623 | * 5/2000 | Tanka et al. | 310/206 |
| 6,057,626 | * 5/2000 | Tanaka et al. | 310/223 |

FOREIGN PATENT DOCUMENTS

| | | |
|---|---|---|
| 48-13804 | 2/1973 | (JP) . |
| 52-109105 | 9/1977 | (JP) . |

* cited by examiner

*Primary Examiner*—Nestor Ramirez
*Assistant Examiner*—Dang Dinh Le
(74) *Attorney, Agent, or Firm*—Leydig, Voit & Mayer, Ltd.

(57) ABSTRACT

A commutator assembly for an electric motor includes a commutator having commutator segments arranged circumferentially, brushes contacting the commutator segments, and an equalizer connecting commutator segments so they have the same electric potential, the equalizer including printed circuit boards with insulating substrates and a connecting plate having an electrically conducting film on the insulating substrate, electrically connected to the commutator segments.

9 Claims, 20 Drawing Sheets

DYNAMO-ELECTRIC MACHINE WITH COMMUTATOR ASSEMBLY

BACKGROUND OF THE INVENTION

1. Field of the Invention

The present invention relates to a commutator assembly for a dynamo-electric machine for rectifying a current by placing brushes in contact with commutator segments.

2. Description of the Related Art

FIG. 32 shows a conventional commutator assembly for a direct-current motor. In the figure, reference numeral 100 denotes a rotor core, 101 denotes a commutator, 102 denotes commutator segments, 103 denotes equalizer, 104 denotes rotor windings, 105 denotes riser portions, and 106 and 107 denote securing members.

The equalizer 103 electrically connect commutator segments 102 which are to have the same electric potential, and as shown in FIG. 33, the straight-angled conductor-shaped equalizer portions 110 being component members of the equalizer 103 and the commutator segments 102 are connected at connecting portions 108 using a means such as brazing, etc.

In a commutator assembly for a direct-current motor of the above construction, one problem has been that the securing members 107 are required to secure the equalizer 103 in order to support the equalizer 103 against centrifugal force, and for that reason the electric motor has been enlarged, and it has been difficult to apply the assemblies to small electric motors, particularly of the type used in automobile electrical systems.

SUMMARY OF THE INVENTION

The present invention aims to solve the above problems and an object of the present invention is to provide a commutator assembly for a dynamo-electric machine having advantages such as enabling reductions in size, etc.

To this end, according to the present invention, there is provided a commutator assembly for a dynamo-electric machine comprising: a commutator having a plurality of commutator segments arranged circumferentially thereupon; brushes contacting the commutator segments; and an equalizer connecting the commutator segments which are to have the same electric potential; the equalizer being provided with printed circuit board comprising an insulating substrate and a connecting plate composed of a conducting film formed on the insulating substrate being electrically connected to the commutator segments.

DETAILED DESCRIPTION OF THE PREFERRED EMBODIMENTS

Embodiment 1

Embodiment 1 of the present invention will be explained with reference to FIGS. 1 to 15.

Figure 1:
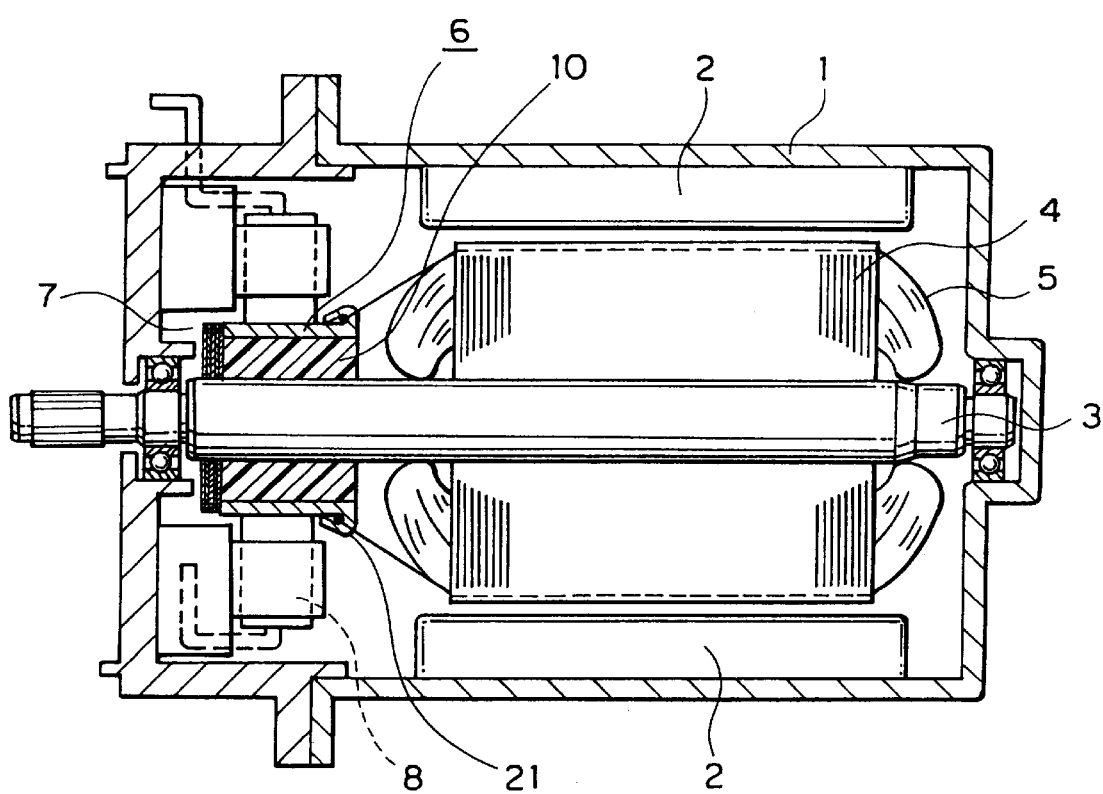
FIG. 1 is a complete cross-section of an electric motor according to Embodiment 1 of the present invention.

FIG. 1 is a diagram of the complete construction of a direct-current electric motor being a dynamo-electric machine according to Embodiment 1 of the present invention, where reference number 1 denotes a yoke, 2 denotes permanent magnets secured around the inner circumferential surface of the yoke 1, 3 denotes a rotor shaft disposed so as to rotate freely within the yoke, 4 denotes a rotor core secured to the rotor shaft 3, 5 denotes rotor windings composed of enamel-coated copper wire wound into slots in the rotor core 4, 6 denotes a commutator disposed at one end of the rotor core 4 and secured to the rotor shaft 3, 7 denotes an equalizer disposed in close proximity to the commutator 6 and secured to the rotor shaft 3, and 8 denotes brushes pressed against the surface of the commutator 6.

Figure 2:
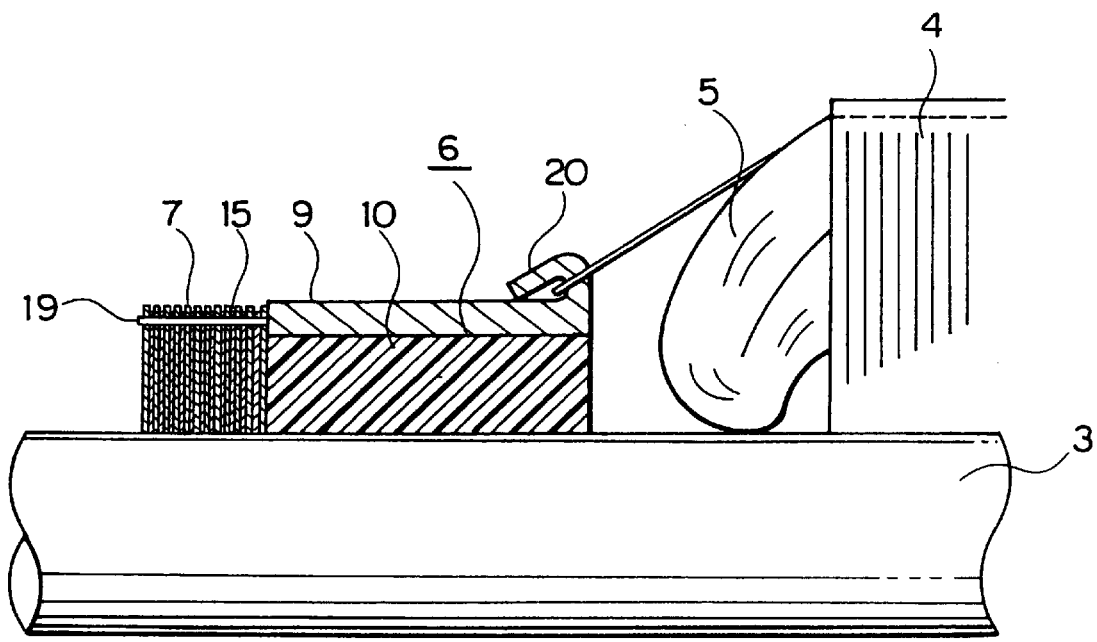
FIG. 2 is a partial enlargement of FIG. 1.

FIG. 2 is a partial enlargement of the commutator 6 in FIG. 1. The commutator 6 comprises a plurality of commutator segments a disposed with even pitch around the circumference thereof, and a commutator molded portion 10 disposed inside the commutator segments 9 for securing the commutator segments 9 and insulating between the commutator segments 9.

Figure 3:
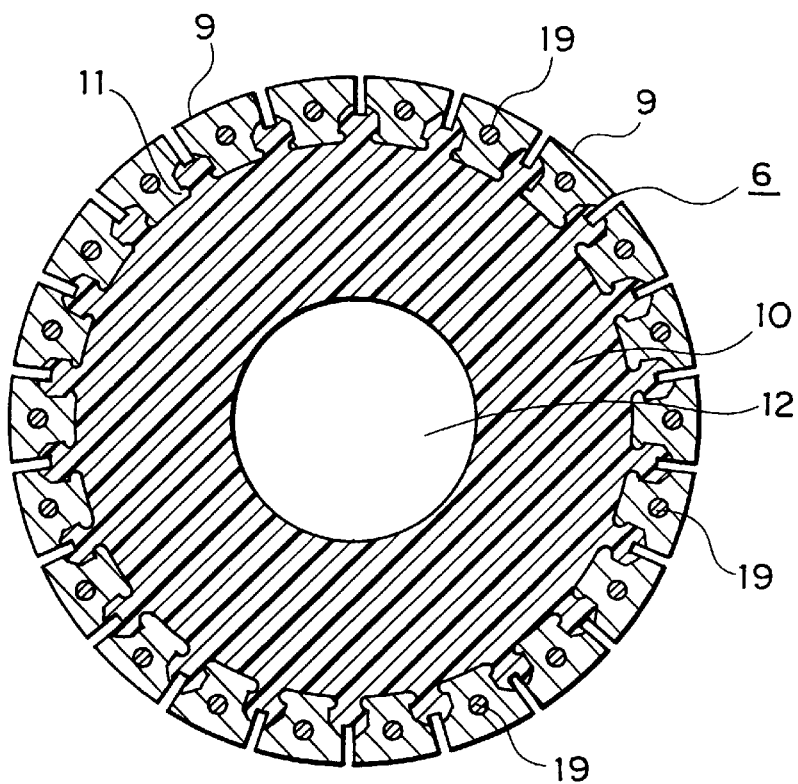
FIG. 3 is a cross-section of the commutator in FIG. 1.
Figure 4:
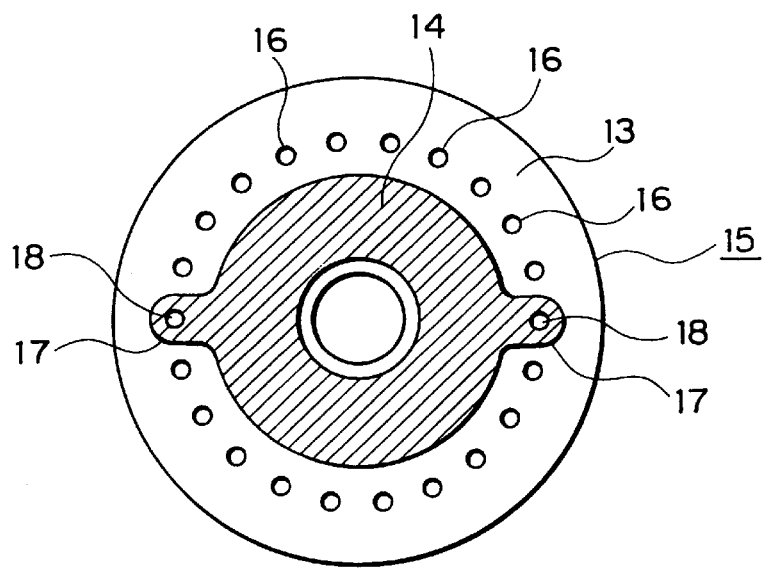
FIG. 4 is a front elevation of a printed circuit board for the equalizer in FIG. 1.
Figure 5:
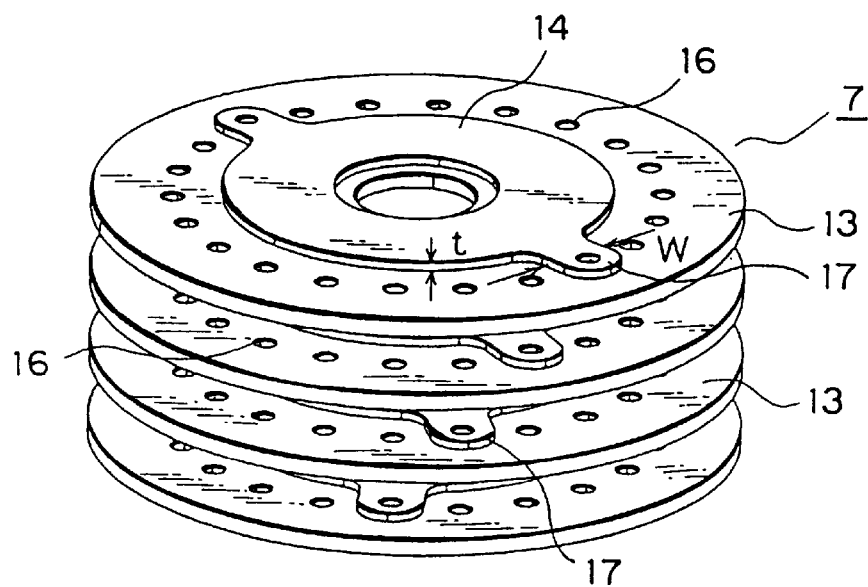
FIG 5 is a conceptual diagram showing the method of laminating the printed circuit boards in FIG. 1.
Figure 6:
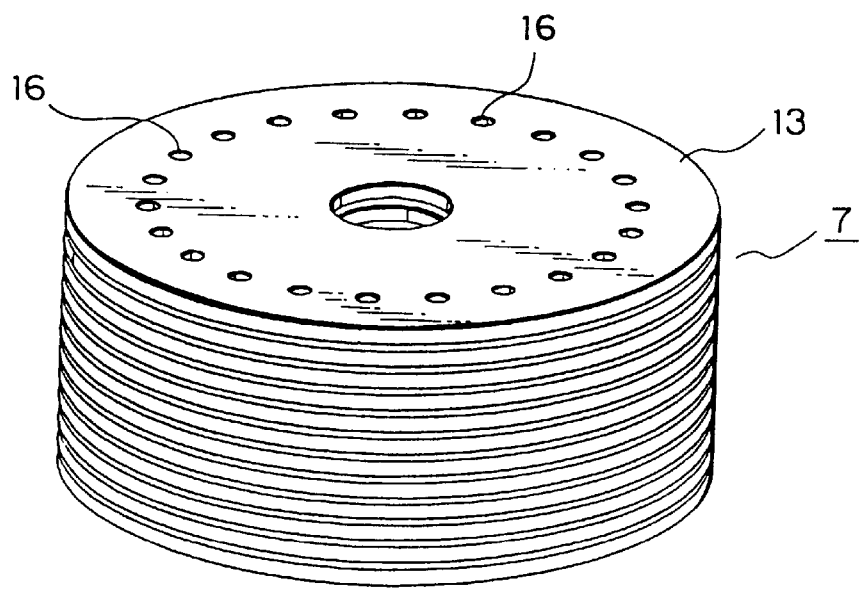
FIG. 6 is a perspective view of the equalizer in FIG. 1.
Figure 7:
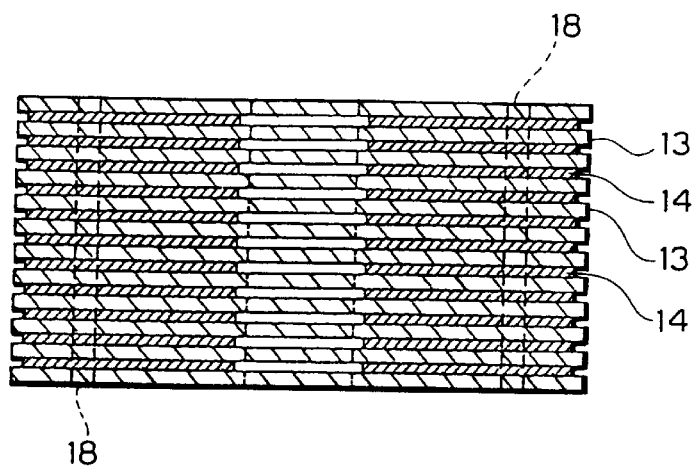
FIG. 7 is a cross-section of the equalizer in FIG. 1.

FIG. 3 is a cross-section of the commutator 6 in FIG. 1. Receiving portions 11 for keeping the commutator segments 9 mutually separated and for securing the commutator segments 9 and the commutator molded portion 10 are formed at the roots of the commutator segments 9. During insertion molding, resin injected into the mold flows between the receiving portions 11 and becomes the portion supporting the commutator after the resin sets. Furthermore, a shaft bore 12 for the passage of the rotor shaft 3 is formed radially inside the commutator molded portion 10. In other words, the commutator molded body 10 serves the function of supporting the commutator segments 9 against centrifugal force, the function of keeping the commutator segments 9 mutually separated, and the function of securing the commutator 6 to the rotor shaft 3.

FIGS. 4 to 7 show the equalizers 7 from FIGS. 1 and 2. The equalizer 7 comprise a plurality of laminated printed circuit boards 15 including connecting plates 14 wherein conductor layers are formed on insulating substrates 13 by a process such as etching, etc. Passage bores 16 are formed with even pitch around a peripheral portion of the insulating substrate 13. The number of passage bores 16 corresponds to the number of commutator segments, and because this embodiment employs a 4-pole, 22-slot, lap-wound direct-current electric motor having 22 commutator segments, it is formed with 22 passage bores 16. The connecting plates 14 are formed in a pattern so as to continuously link commutator segments 9 which are to have the same electric potential. In other words, protrusions 17 protruding radially outwards are formed in mutually opposite positions, and passage bores 18 are formed in these protrusions 17.

The equalizer 7 may be formed by laminating a plurality of printed circuit boards 15 machined into circular shapes, or by disposing a plurality of connecting plates by etching on a single insulating plate, laminating a plurality of such insulating plates, then separating them into individual equalizers 7 by punching, etc. Furthermore, if the thickness t of the connecting plates 14 is 70 μm and the width W of the protrusions 17 of the connecting plates 14 is 5 mm, the cross-sectional area of the protrusions 17 is 0.35 mm$^2$, which ensures an electrical current capacity of generally the same level as a conducting wire 0.7 mm in diameter.

Figure 8:
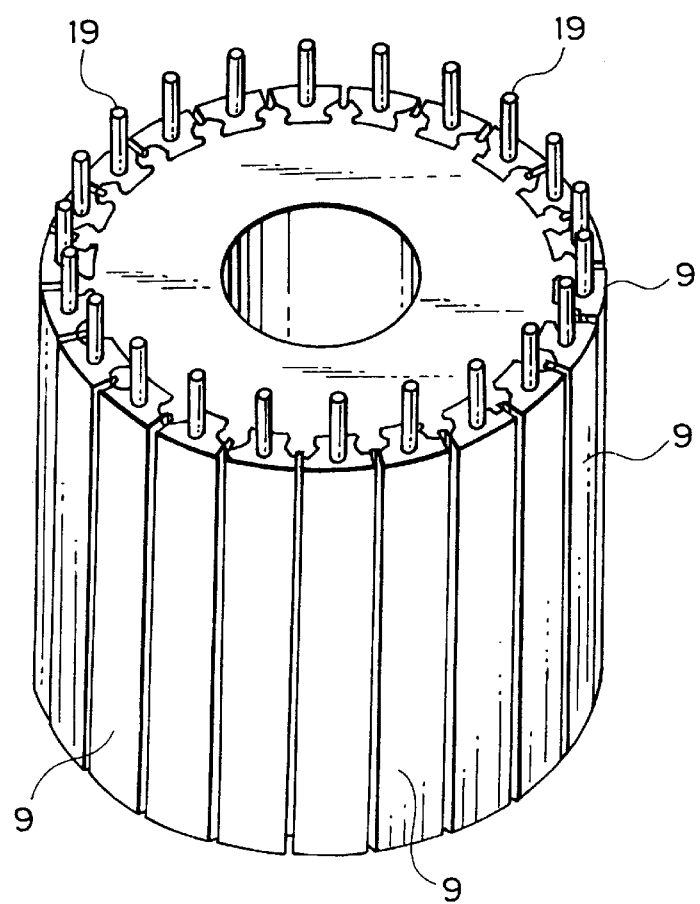
FIG. 8 is a perspective view of the commutator in FIG. 1.
Figure 9:
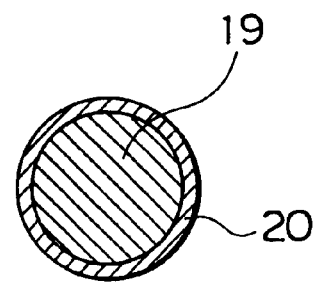
FIG. 9 is a lateral cross-section of a connecting projection for commutator segments from FIG. 1.
Figure 10:
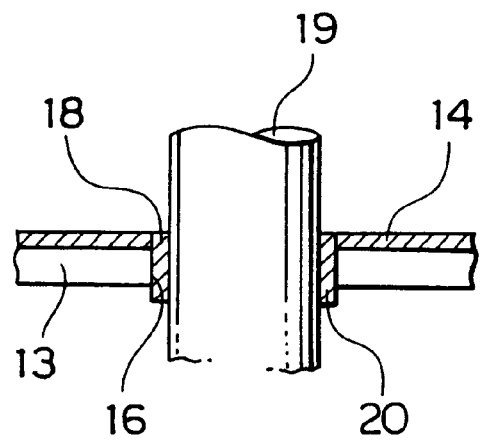
FIG. 10 is a cross-section showing a connection between a printed circuit board and a connecting projection for commutator segments from FIG. 1.

Next, the method of connecting the commutator segments 9 and the connecting plates 14 of the printed circuit boards 15 will be explained with reference to FIGS. 9 and 10. As shown in FIG. 8, round rod-shaped connecting projections 19 are integrally preformed on the commutator segments 9. On the other hand, conducting films 20 are formed on the inner walls of the passage bores 18 of the connecting plates 14 and the passage bores 16 of the insulating substrates 13 overlapping the passage bores 18, respectively. The commutator segments 9 and the connecting plates 14 are electrically connected by pressing the connecting projections 19 into the passages formed by the overlapping of the passage bores 18 and the passage bores 16.

Moreover, the connecting projections 19 also pass through the passage bores 16 of the insulating plates 13 which do not overlap the passage bores 18 of the connecting plates, and these connecting projections 19 electrically connect commutator segments 9 which are to have the same electric potential by means of other connecting plates 14.

Figure 11:
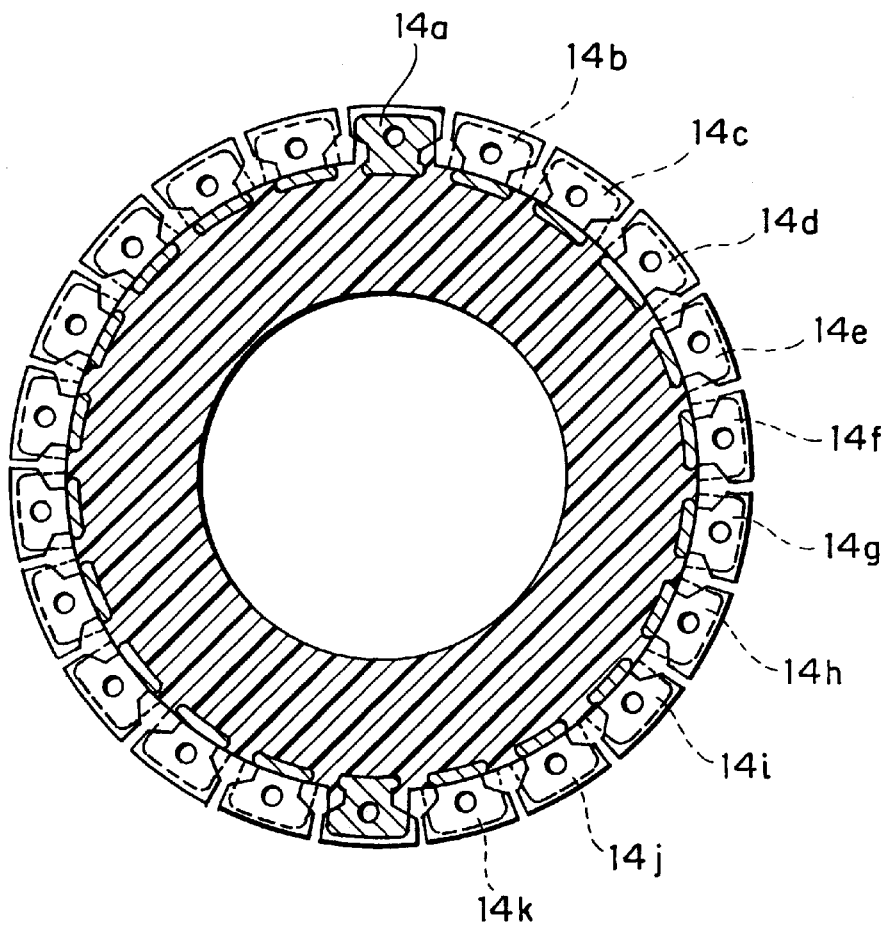
FIG. 11 is a diagram showing connections between a connecting plate and commutator segments from FIG. 1.

FIG. 11 shows the positional relationship between the commutator segments 9 and the connecting plates 14. In the equalizer 7 in this embodiment, eleven connecting plates 14a to 14k are stacked in layers, and the protrusions 17 on each of these connecting plates 14a to 14k electrically connect commutator segments 9 positioned on opposite sides. Moreover, the order in which the connecting plates 14a to 14k are laminated is arbitrary.

In an electric motor of the above construction, because the equalizer is disposed at one end of the commutator 6 and are at the opposite end from the risers 21 as shown in FIGS. 1 and 2, the equalizer 7 does not interfere with the winding operation during the process of installing the rotor windings 5 on the rotor core 4. Furthermore, because the outer diameter of the equalizer 7 is smaller than the outer diameter of the brush contact surfaces of the commutator 6, it is no longer necessary to move the brushes 8 radially outwards beyond the radius of the commutator when the rotor is inserted into the stator during the assembly process, enabling improvements in the production of the motor.

Figure 12:
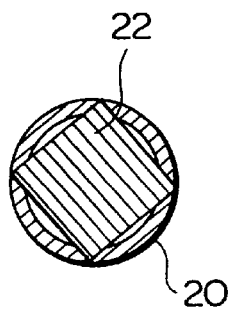
FIG. 12 is cross-section of another example of a connecting projection for commutator segments.

Moreover, the connecting projections 19 are not limited to round rod shapes, and may be square bar shapes like the connecting projections 22 shown in FIG. 12. In that case, because the corner portions of the connecting projections 22 only partially bond to the conducting films 20, the connecting projections 22 can be more easily inserted into the passages.

Figure 13:
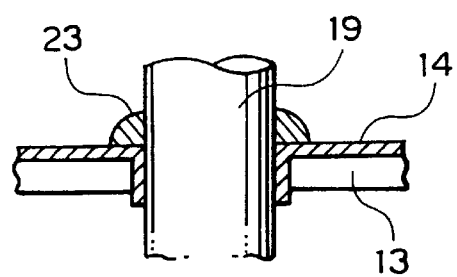
FIG. 13 is a cross-section showing another connection between a printed circuit board and a connecting projection for commutator segments.

Furthermore, as shown in FIG. 13, the connecting projections 19 may also be secured to the printed circuit boards 15 by means of brazing, etc., using a brazing agent 23 such as solder, copper, etc.

Figure 14:
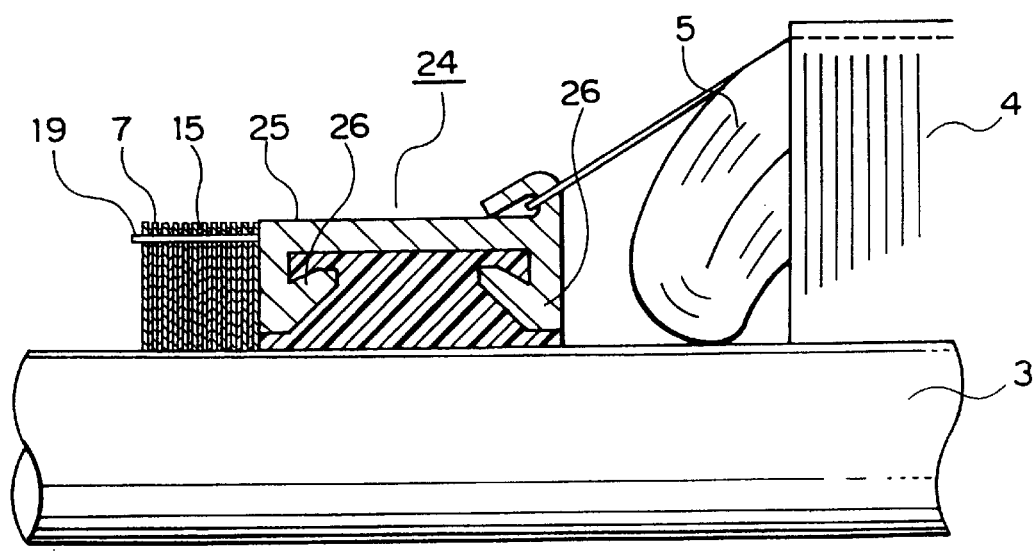
FIG. 14 is a partial cross-section of an example of a commutator assembly differing from the commutator assembly in FIG. 1.

In addition, the roots of the commutator segments 9 of the commutator 6 are formed into a receiving portions 11, but the commutator 24 shown in FIG. 14 may also be used. That is, in the commutator 24, hook shaped fastening portions 26 are formed at both ends of commutator segments 25.

Figure 15:
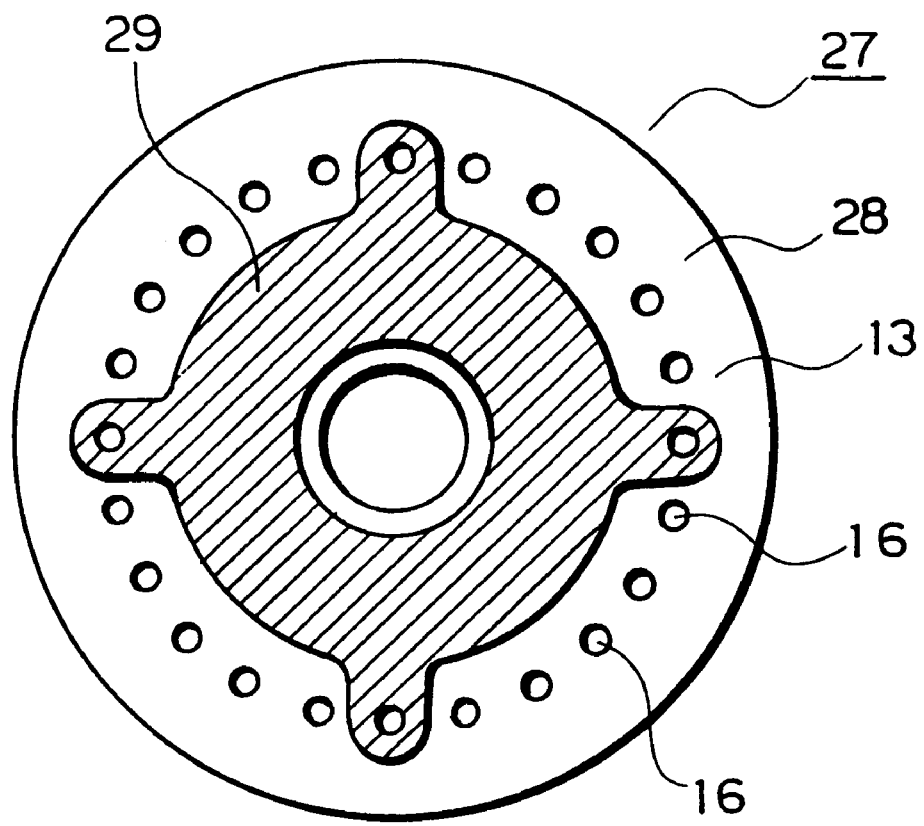
FIG. 15 is a front elevation of an example of a printed circuit board differing from the printed circuit boards in FIG. 1.

Furthermore, in this embodiment, a 4-pole, 22-slot example was given, but application to other numbers of poles and slots is possible. For example, FIG. 15 is a front elevation of a printed circuit board 28 for an equalizer 27 applied to an 8pole, 24 slot electric motor, and because there are a total of six sets of four commutator segments which are to have the same electric potential, four commutator segments are electrically connected by the connecting plate of each single printed circuit board 28.

Embodiment 2

Figure 16:
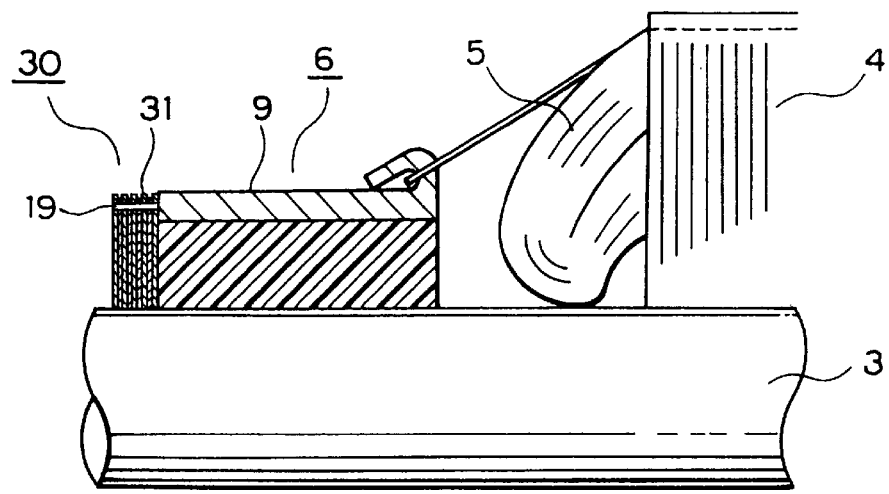
FIG. 16 is a partial enlargement of a commutator assembly for an electric motor according to Embodiment 2 of the present invention.
Figure 17:
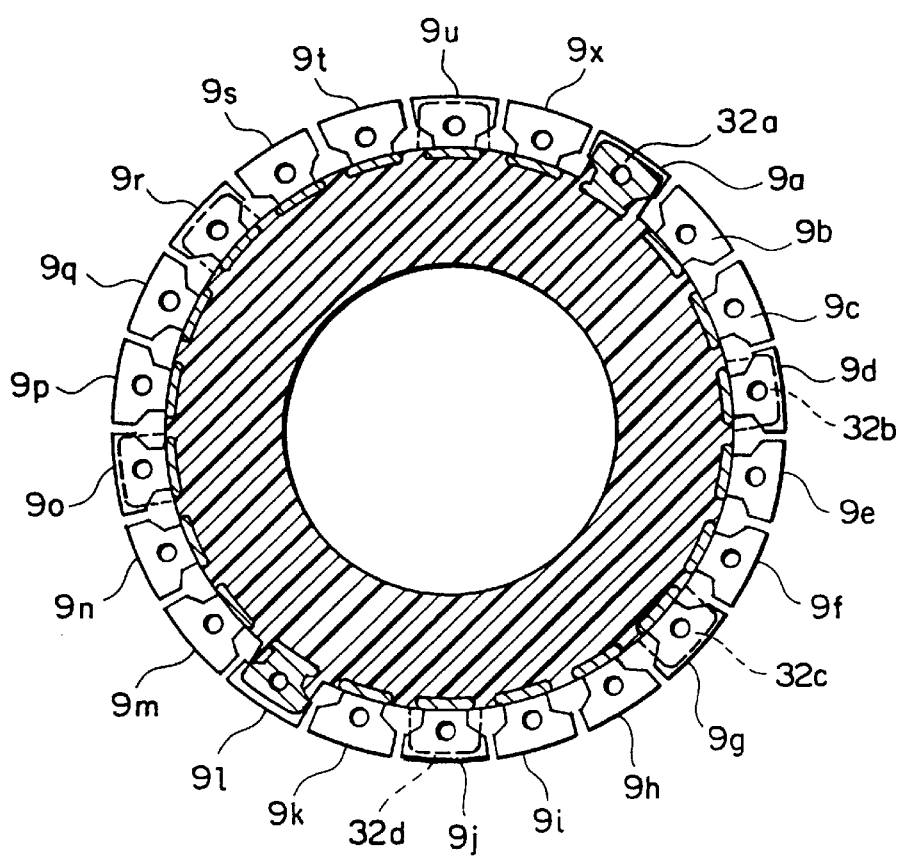
FIG. 17 is a diagram showing connections between a connecting plate and commutator segments from FIG. 16.

FIGS. 16 and 17 show Embodiment 2 of the present invention, which will be explained using the same numbering for portions the same as or corresponding to those of Embodiment 1.

In this embodiment, an equalizer 30 constructed by laminating four printed circuit boards 31 are used in an electric motor in which the number of poles is four and the number of slots Ns is 22.

In the equalizer 30, a commutator segment 9a is connected to a commutator segment 9l by a connecting plate 32a of a printed circuit board 31, a commutator segment 9d is connected to a commutator segment 9o by a connecting plate 32b, a commutator segment 9g is connected to a commutator segment 9r by a connecting plate 32c, and a commutator segment 9j is connected to a commutator segment 9u by a connecting plate 32d, respectively.

In this manner, although it is normally desirable to connect all commutator segments 9 which are to have the same electric potential, it is possible to omit some connections where necessary.

Figure 18:
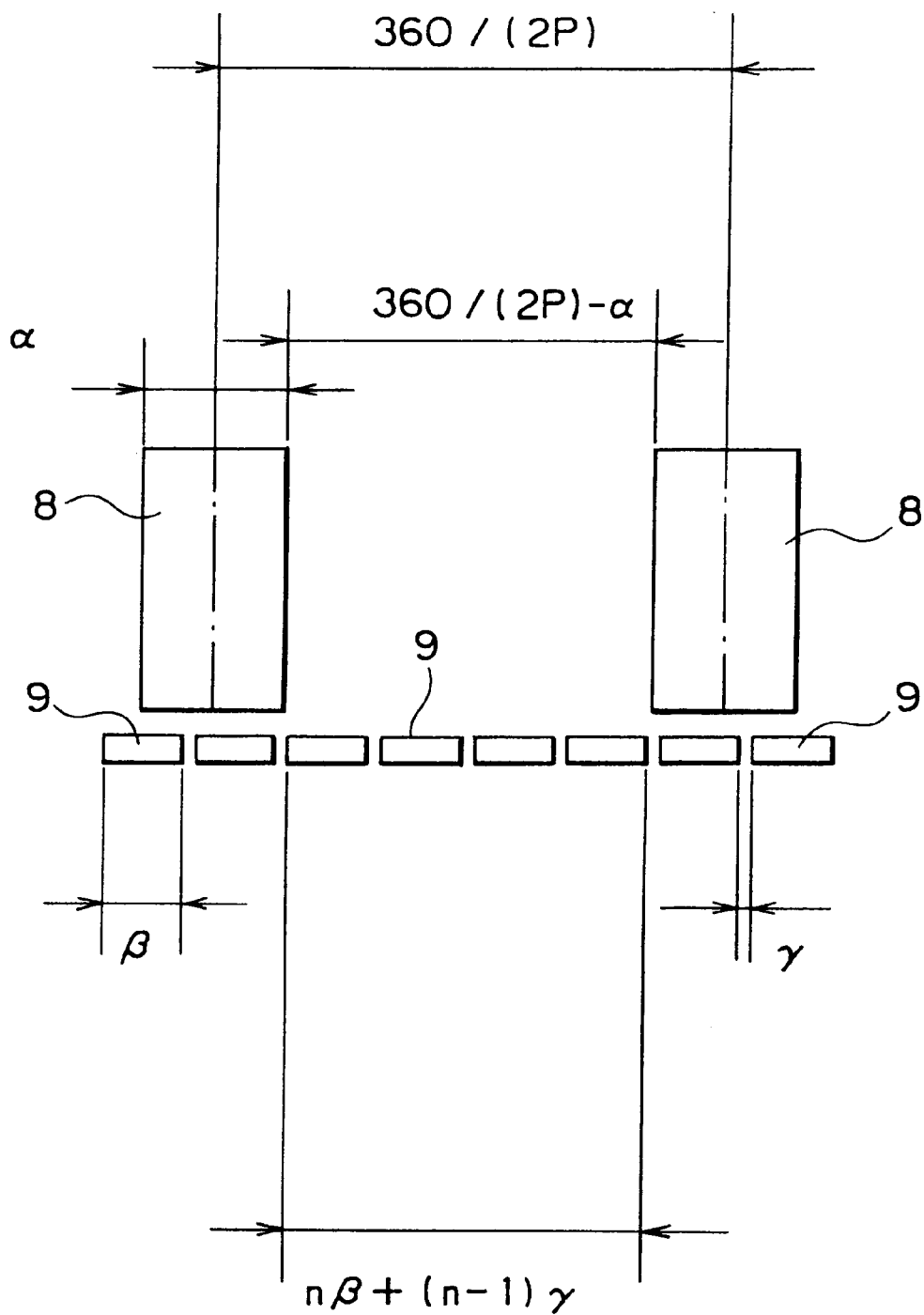
FIG. 18 is a diagram showing the positional relationship between brushes and the commutator at the brush contact surfaces.

FIG. 18 is a conceptual diagram for finding the lower limit to the number of the connecting plates 32 and represents a planimetric development at the contact surface between the brushes 8 and the commutator segments 9.

In FIG. 18, the maximum number of commutator segments 9 which can be present between the brushes 8 is given by a natural number n satisfying the expression $$(n\beta+(n-1)\gamma) \leq (360/(2P)-\alpha) \tag{1}$$

where P is the number of pairs of poles,
Ns is the number of slots,
$\alpha$ is the brush angle at the contact surface between the brushes 8 and the commutator segments 9,
$\beta$ is the angle covered by each commutator segment 9, and
$\gamma$ is the angle between commutator segments 9.

If the number K of connecting plates 32 relative to n, is a whole number satisfying the expression $$(Ns/(n \times P)) \leq K \leq (Ns/P) \tag{2},$$

then at least one of the commutator segments 9 present between the brushes 8 will be connected by a connecting plate 32.

Moreover, this embodiment has been explained using a 4-pole electric motor in which the number of slots Ns is 22 and the number of brushes 8 is 4, but the embodiment is not limited to this configuration, and any configuration may be used provided that the number K of connecting plates 32 is a whole number satisfying expression (2).

Moreover, the upper limit to the number of connecting plates 32 is generally given to be (Ns/P), but commutator segments 9 which are to have the same electric potential may be connected by a plurality of connecting plates. In that case, the current capacity of each of the connecting plates can be reduced.

Furthermore, in each of the above embodiments, the equalizers 7, 27, 30 are disposed only on the same end as the commutators 6, 24, but a separate equalizer may be used in addition to these in the vicinity of the rotor windings at the opposite end from the commutator.

Embodiment 3

Figure 19:
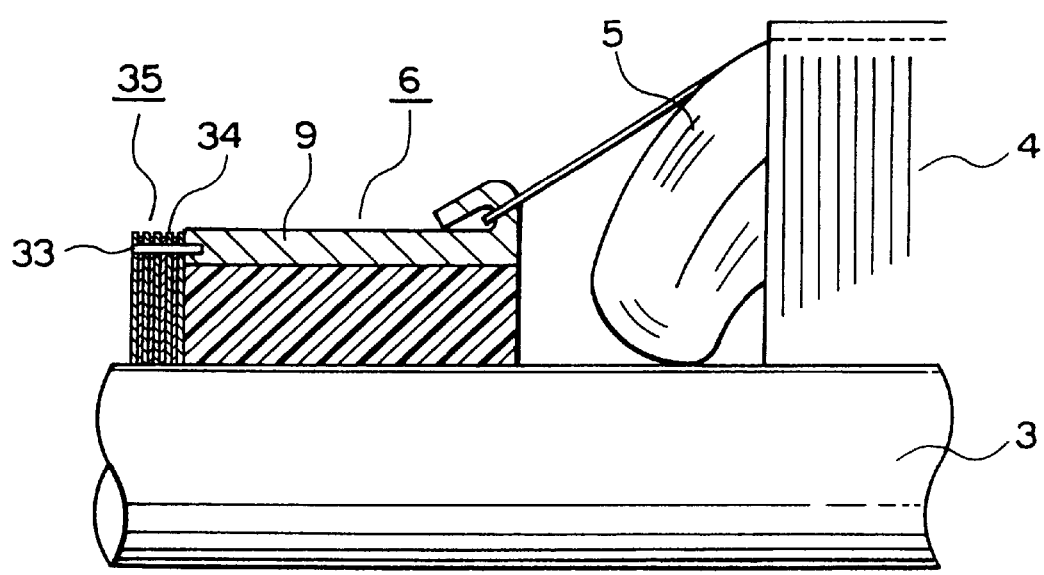
FIG. 19 is a partial enlargement of a commutator assembly for an electric motor according to Embodiment 3 of the present invention.

FIG. 19 is a partial enlargement of a commutator assembly for an electric motor according to Embodiment 3 of the present invention. In the equalizer 35 of this embodiment, connector pins 33, separate members from the commutator segments 9, are used instead of the connecting projections 19, 22. The connector pins 33 are secured in pin insertion recesses 34 predisposed in the commutator segments 9 using a securing means such as brazing, soldering, press fitting, threading, etc. Since the cross-sectional shape and function of the connector pins 33 is the same as that of the connecting projections 19, 22 in Embodiment 1, explanation thereof will be omitted.

In this embodiment, because of the adoption of a construction wherein separate connector pins 33 are inserted into the commutator segments 9, precision in positioning the connector pins 33 can be improved. Furthermore, control over the precision of the cross-sectional dimensions of the connector pins 33 is facilitated, enabling the connection to the equalizers 35 to be made more reliable.

Embodiment 4

Figure 20:
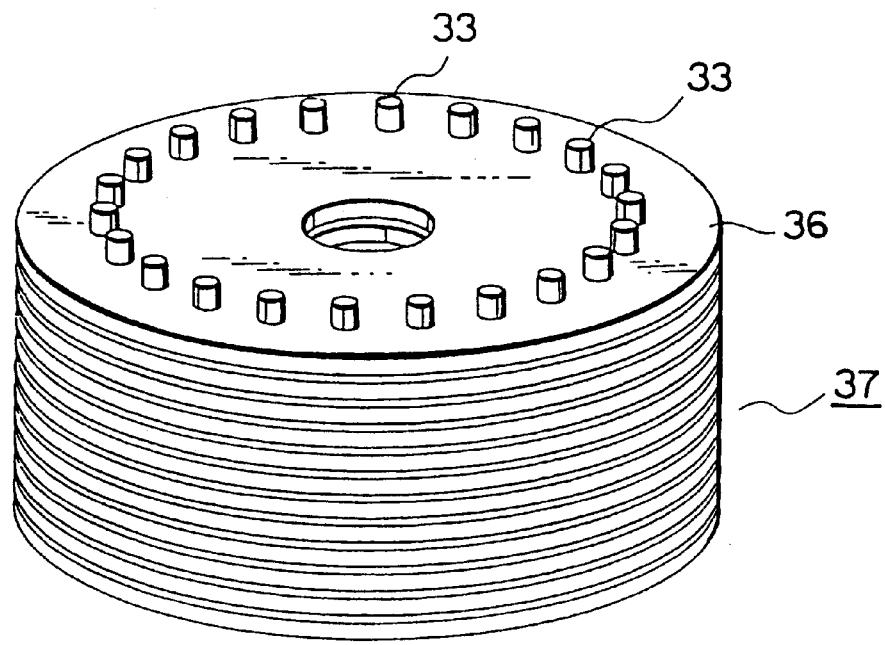
FIG. 20 is a perspective view of equalizer according to Embodiment 4 of the present invention.
Figure 21:
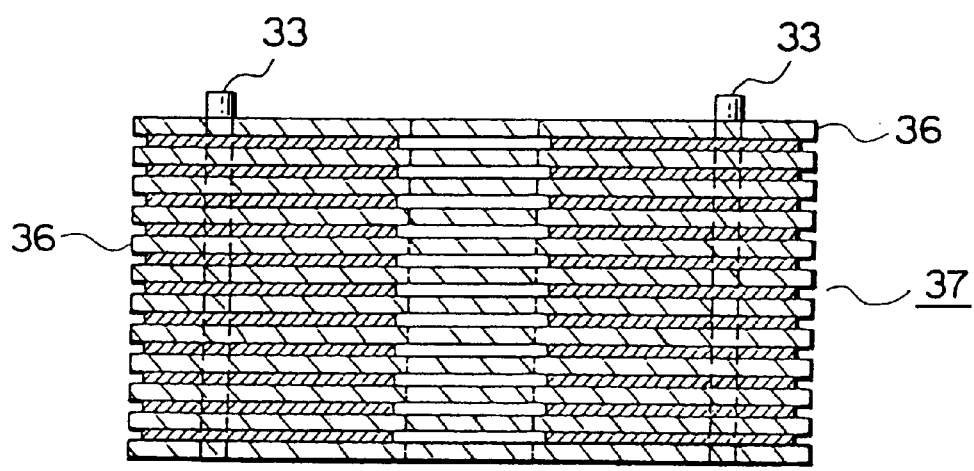
FIG. 21 is a cross-section of the equalizer in FIG. 20.

FIGS. 20 and 21 show a commutator assembly for an electric motor according to Embodiment 4 of the present invention. In the equalizer 37 of this embodiment, the connector pins 33 and a plurality of printed circuit boards 36 are integrated in advance. Because the mechanically-weak printed circuit boards 36 are preformed into a block by connecting the equalizer 37 to the commutator 6 by means of the connector pins 33 and are bonded to the commutator 6 in such a state, productivity is improved.

Embodiment 5

Figure 22:
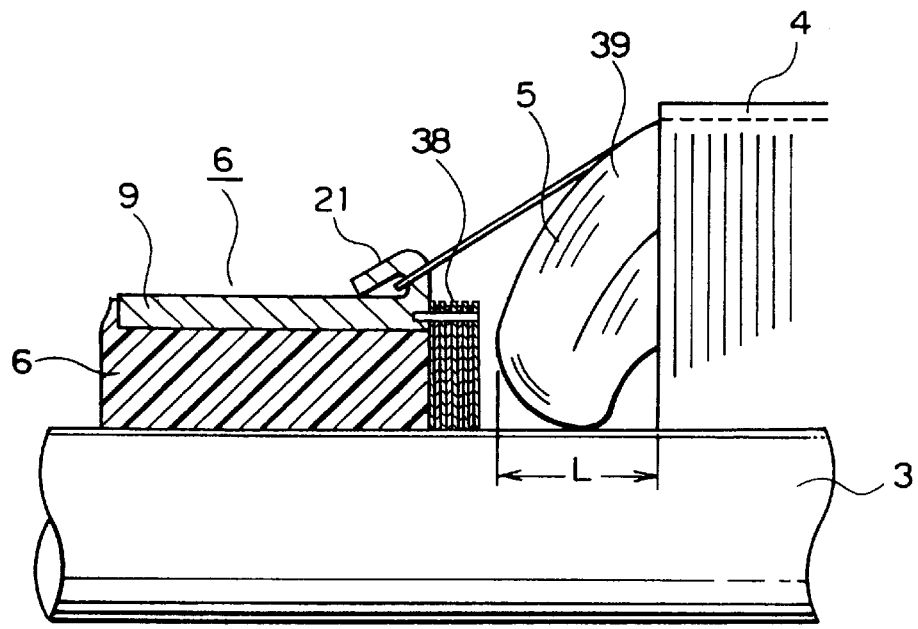
FIG. 22 is a partial enlargement of a commutator assembly for an electric motor according to Embodiment 5 of the present invention.

FIG. 22 shows a commutator assembly for an electric motor according to Embodiment 5 of the present invention. The equalizer 38 in this embodiment is disposed on an axial end portion of the commutator 6 at the same end as the risers 21.

In this embodiment, the equalizer 38 is disposed between the commutator 6 and the rotor windings 5, but because the outer circumferential dimensions of the equalizer 38 is smaller than the outer diameter of the brush contact surfaces of the commutator 6 and the axial length of the equalizer 38 is short, even if the equalizer 38 and the commutator segments 9 are connected in advance and then the winding operation wherein the rotor windings 5 are mounted by winding wire onto the rotor core 4 is performed, the ease of the winding operation is the same as when the equalizer have not yet been disposed. Furthermore, since it is necessary for the distance between the risers 21 and the rotor core 4 to be greater than the length L of the end portion 39 of the rotor windings 5 for the convenience of the automatic winding process, it is normal for a space to arise between the commutator 6 and the end portion 39 of the rotor windings 5. In this embodiment, the equalizer 38 is disposed in this space, eliminating the need to lengthen the electric motor in the axial direction due to installation of the equalizer.

Embodiment 6

Figure 23:
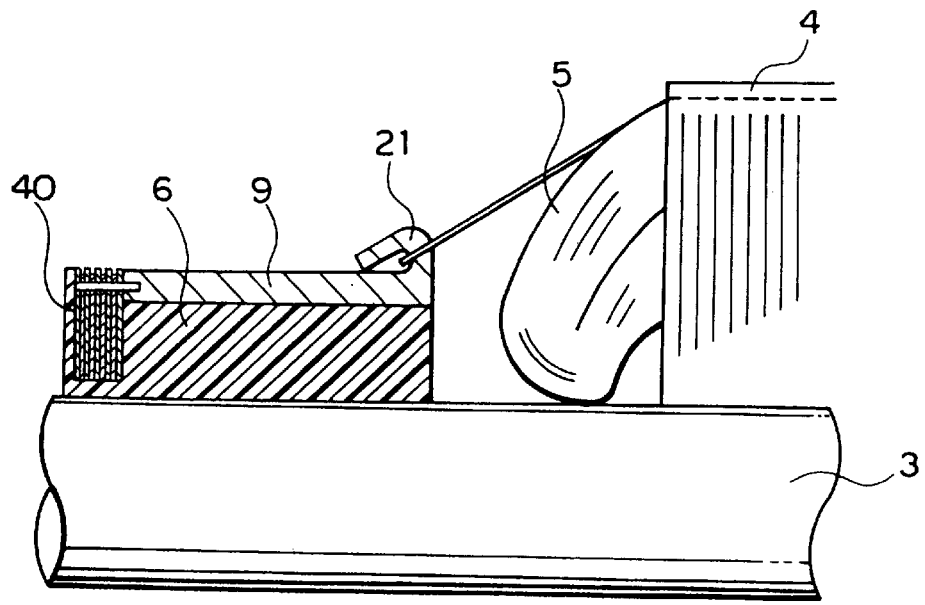
FIG. 23 is a partial enlargement of a commutator assembly for an electric motor according to Embodiment 6 of the present invention.

FIG. 23 shows a commutator assembly for an electric motor according to Embodiment 6 of the present invention. The equalizer 40 in this embodiment is integrated with the commutator 6 by means of resin on an axial end portion of the commutator 6.

In this embodiment, because the equalizer 40 and the commutator 6 are integrated by resin, both are firmly secured, and because the insulation between the commutator segments 9 including the connector pins is improved, short circuiting between printed circuit boards of equalizer 40 is prevented even in the presence of foreign matter such as iron filings, etc.

Embodiment 7

Figure 24:
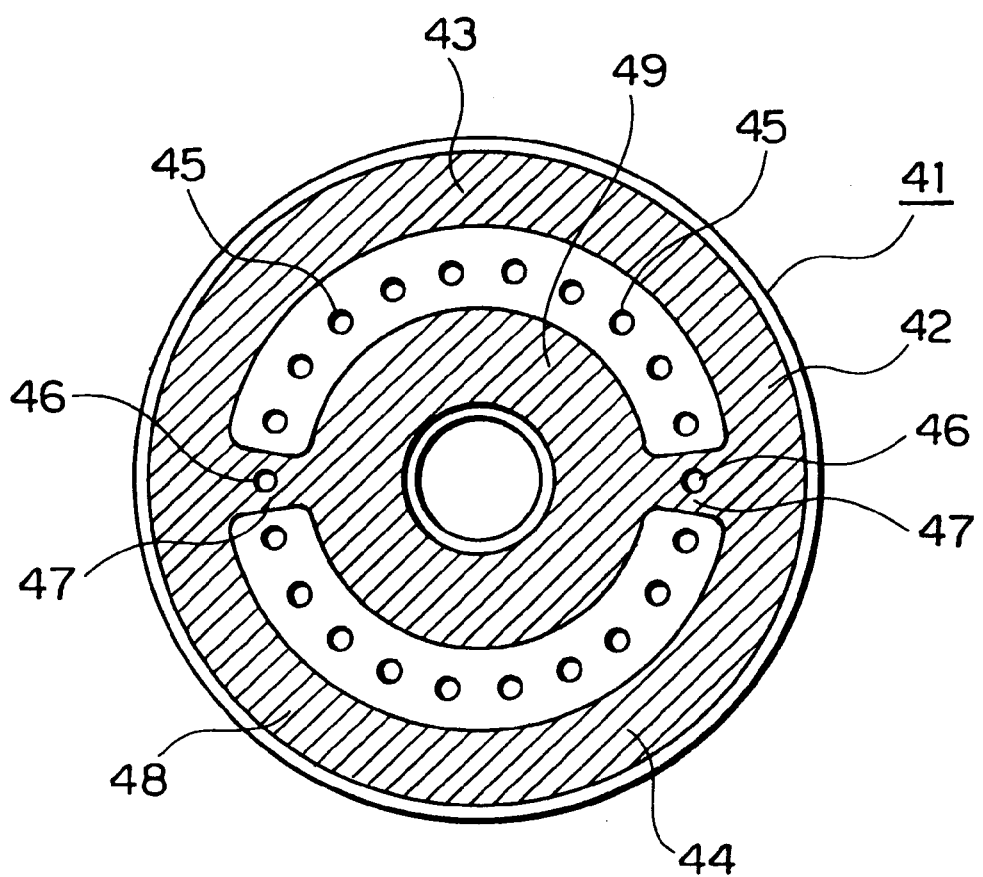
FIG. 24 is a front elevation of a printed circuit board according to Embodiment 7 of the present invention.

FIG. 24 shows a commutator assembly for an electric motor according to Embodiment 7 of the present invention. The equalizer 41 in this embodiment comprises a plurality of laminated printed circuit boards 42 formed with connecting plates 44 wherein conductor layers are formed on insulating substrates 43 by a process such as etching, etc. Passage bores 45 are formed with even pitch around a peripheral portion of the insulating substrate 43. The number of passage bores 45 corresponds to the number of commutator segments, and because the example in this embodiment employs a 4-pole, 22-slot, lap-wound electric motor having 22 commutator segments, it is formed with 22 passage bores 45. The connecting plates 44 are formed with patterns so as to continuously link commutator segments 9 which are to have the same electric potential. These patterns, as indicated by the hatching in the figure, are formed on areas of the peripheral portion 48, of the central portion 49, and where a pair of mutually opposite passage bores 46 are formed, and on bridge portions 47 connecting the peripheral portion 48 to the central portion 49 on each of the connecting plates 44. The conducting layer is not formed on areas corresponding to commutator segments 9 which are not to have the same electric potential.

In this embodiment, commutator segments 9 which are to have the same electric potential are electrically connected to each other through the peripheral portions 48, the central portions 49, and the bridge portions 47 of the connecting plate 44, enabling current capacity to be increased by enlarging the current-carrying area.

Embodiment 8

Figure 25:
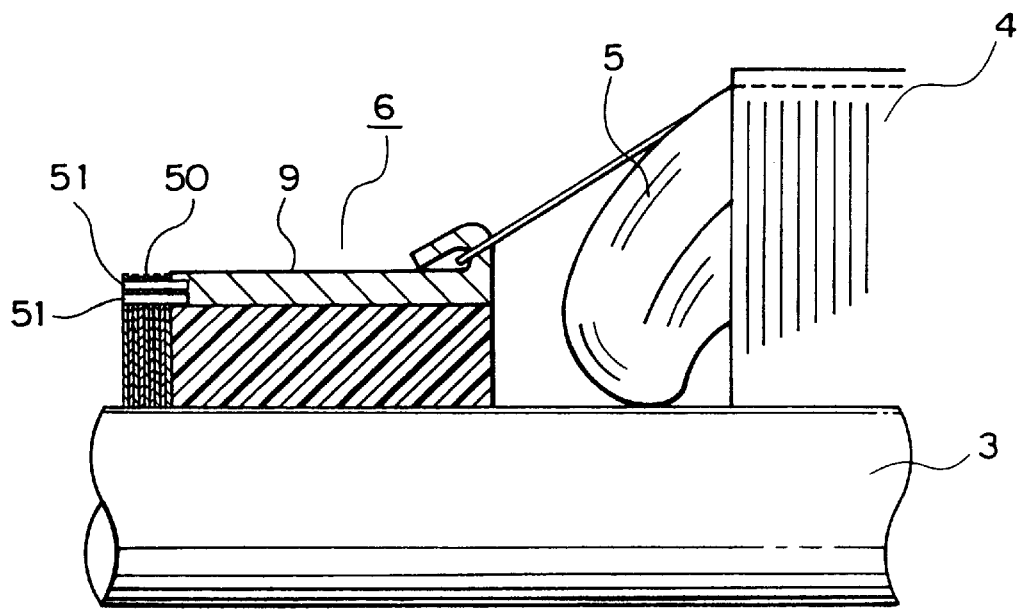
FIG. 25 is a partial enlargement of a commutator assembly for an electric motor according to Embodiment 8 of the present invention.
Figure 26:
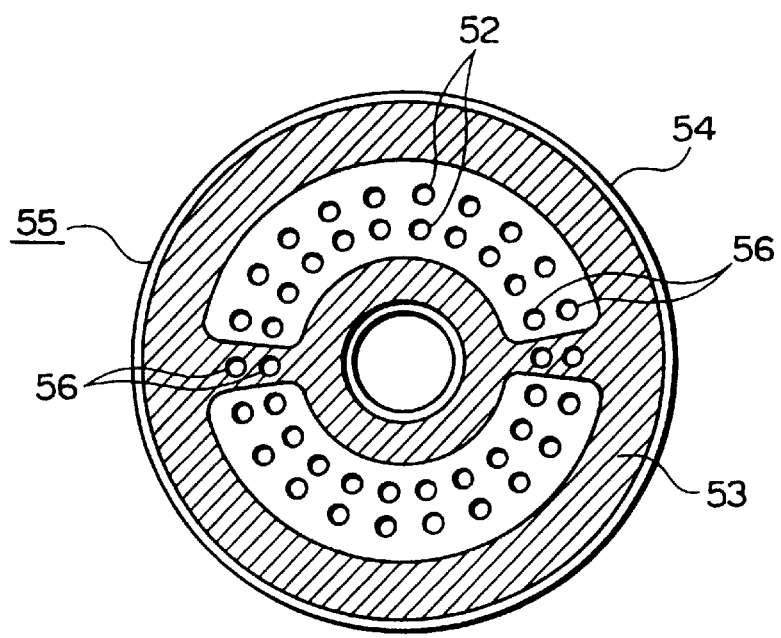
FIG. 26 is a front elevation of a printed circuit board according to Embodiment 8 of the present invention.

FIGS. 25 and 26 show a commutator assembly for an electric motor according to Embodiment 8 of the present invention. The equalizer 50 in this embodiment comprises a plurality of laminated printed circuit boards 55 formed with connecting plates 53 wherein conductor layers are formed on insulating substrates 54 by a process such as etching, etc. Passage bores 52 are formed with even pitch in two rows around a peripheral portion of the insulating substrate 54. The connecting plates 53 are formed with patterns so as to continuously link commutator segments 9 which are to have the same electric potential. Passage bores 56 for connecting two connecting pins 51 for each commutator segment 9 are formed in the connecting plates 53.

In this embodiment, by increasing the number of connecting pins 51, the contact area between the connecting plates 53 and the connecting pins 51 is increased, enabling current capacity to be increased in the contacting portions.

Embodiment 9

Figure 27:
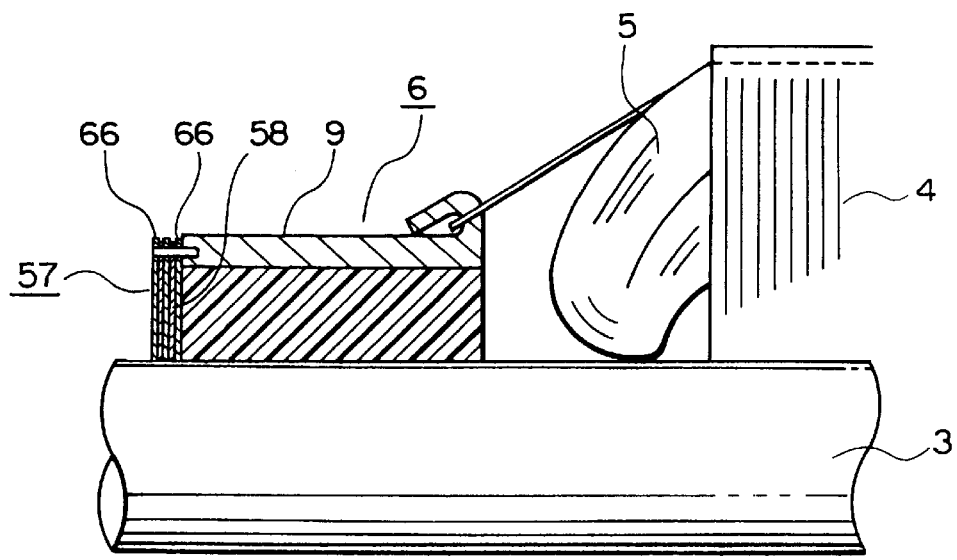
FIG. 27 is a partial enlargement of a commutator assembly for an electric motor according to Embodiment 9 of the present invention.
Figure 28:
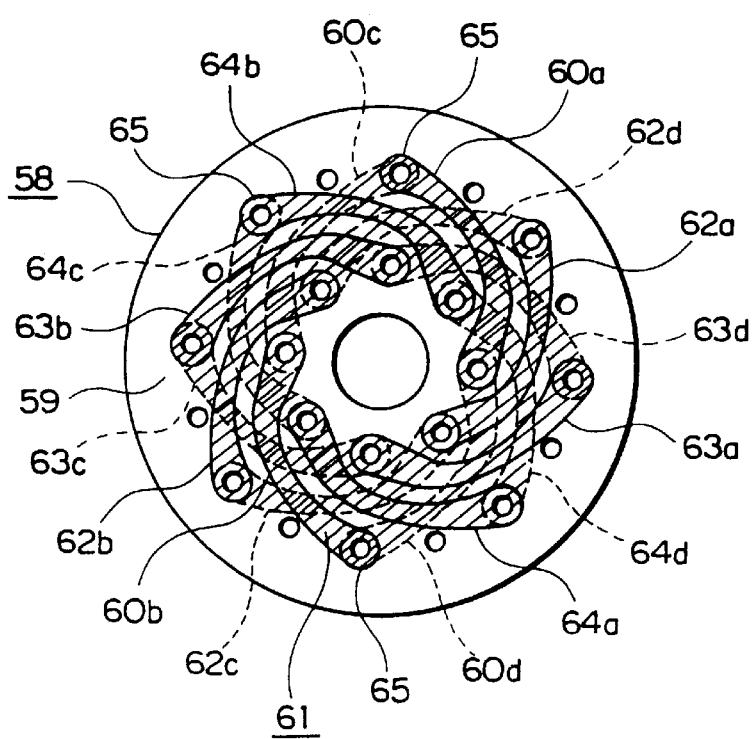
FIG. 28 is a front elevation of a printed circuit board for the equalizer in FIG. 27.

FIGS. 27 and 28 show a commutator assembly for an electric motor according to Embodiment 9 of the present invention. The printed circuit boards 58 of an equalizer 57 in this embodiment are formed with connecting plates 61 wherein conducting layers are formed on both sides of insulating substrates 59 by a process such as etching, etc. The printed circuit boards 58 are connected to the commutator segments 9 through insulating plates 66. The connecting plates 61 comprise a plurality of equipotential conducting layers 60, 62, 63, 64 having mutually different electric potentials. Equipotential conducting layer 60 comprises equipotential conducting layer portions 60a, 60b disposed on the front surface of an insulating substrate 59 and equipotential conducting layer portions 60c, 60d disposed on the rear surface of the insulating substrate 59. Equipotential conducting layer 62 comprises equipotential conducting layer portions 62a, 62b disposed on the front surface of an insulating substrate 59 and equipotential conducting layer portions 62c, 62d disposed on the rear surface of the insulating substrate 59. Equipotential conducting layer 63 comprises equipotential conducting layer portions 63a, 63b disposed on the front surface of an insulating substrate 59 and equipotential conducting layer portions 63c, 63d disposed on the rear surface of the insulating substrate 59. Equipotential conducting layer 64 comprises equipotential conducting layer portions 64a, 64b disposed on the front surface of an insulating substrate 59 and equipotential conducting layer portions 64c, 64d disposed on the rear surface of the insulating substrate 59. The above equipotential conducting layer portions comprised in the above equipotential conducting layers are electrically connected to each other through passage bores 65.

In this embodiment, because a plurality of equipotential conducting layers 60, 62, 63, 64 having mutually different electric potentials are formed on single substrate, it is no longer necessary to dispose the same number of laminated printed circuit boards as the number of different electric potentials. In the example in FIG. 27, four sets of commutator segments 9 having mutually different electric potential can be connected by one printed circuit board 58. Thus, the axial length of the electric motor can be reduced, enabling the electric motor to be made more compact.

Embodiment 10

Figure 29:
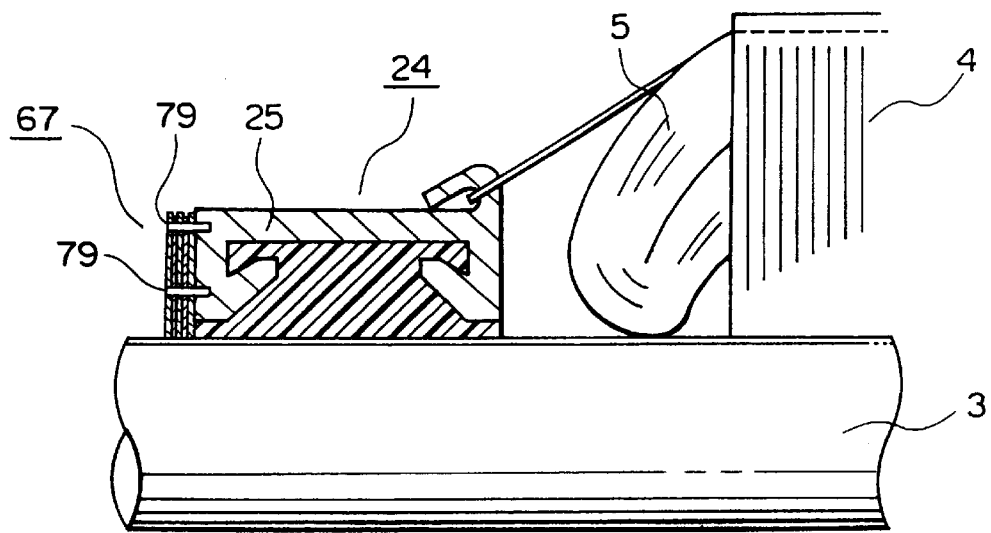
FIG. 29 is a partial enlargement of a commutator assembly for an electric motor according to Embodiment 10 of the present invention.
Figure 30:
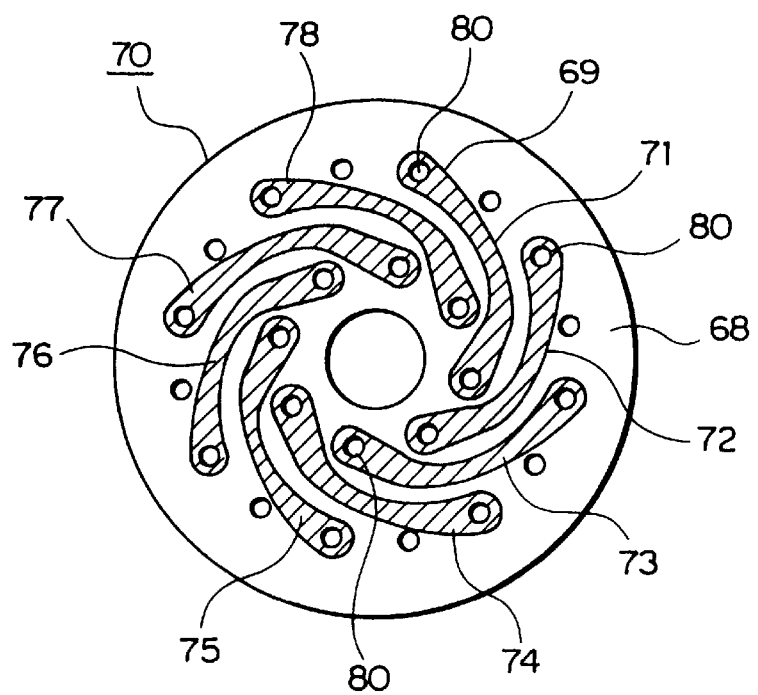
FIG. 30 is a front elevation of a printed circuit board for the equalizer in FIG. 29.

FIGS. 29 and 30 show a commutator assembly for an electric motor according to Embodiment 10 of the present invention. The printed circuit boards 70 of the equalizer 67 in this embodiment are formed with connecting plates 69 wherein conductor layers are formed on insulating substrates 68 by a process such as etching, etc. These printed circuit boards are laminated to constitute the equalizer 67. The connecting plates 69 comprise a plurality of equipotential conducting layers 71 to 78 having mutually different electric potentials. Furthermore, commutator segments 25 which are to have the same electric potential are electrically connected by means of connecting pins 79 passing through the equipotential conducting layers 71 to 78 and passage bores 80. The connecting pins 79 are concentrically disposed in two rows in the commutator 24.

In this embodiment, by forming a plurality of equipotential conducting layers 71 to 78 having mutually different electric potentials on the same insulating substrates 68 and disposing a plurality of connecting pins 79 in the same commutator segments 25, the degree of freedom in the patterns of the connector plates on the insulating substrates 68 can be increased, raising the degree of freedom in designing the equalizers 67.

Embodiment 11

Figure 31:
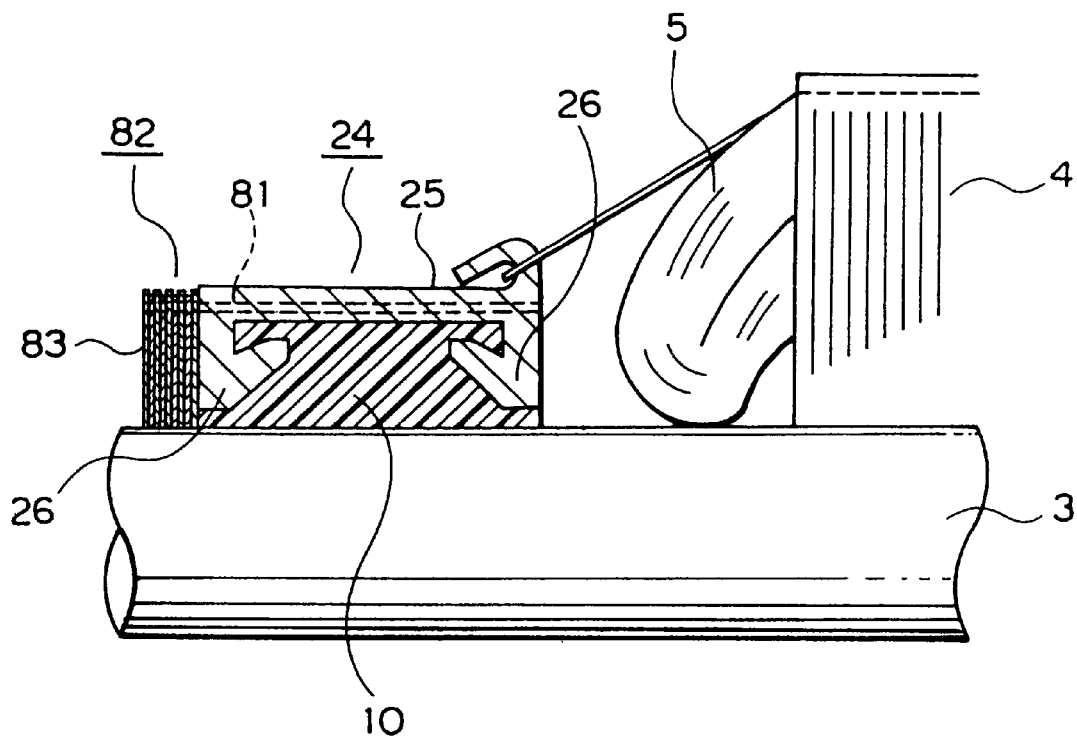
FIG. 31 is a partial enlargement of a commutator assembly for an electric motor according to Embodiment 11 of the present invention.
Figure 32:
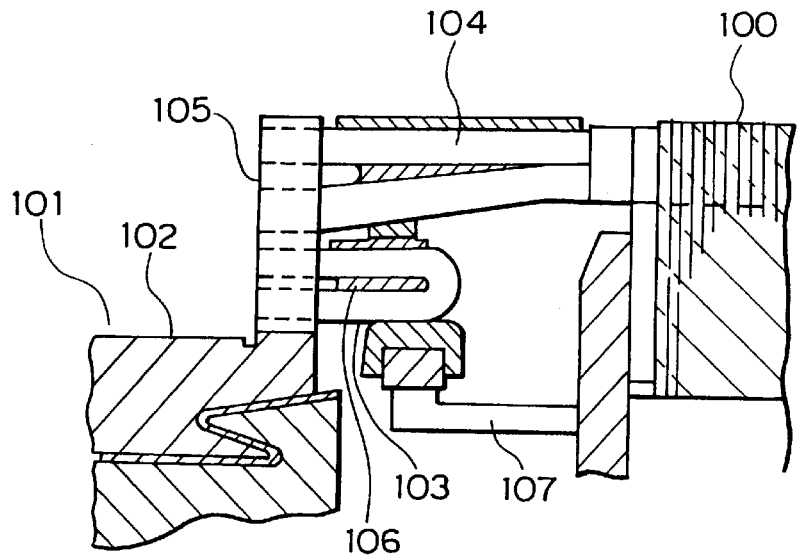
FIG. 32 is a partial enlargement of a conventional commutator assembly for an electric motor.
Figure 33:
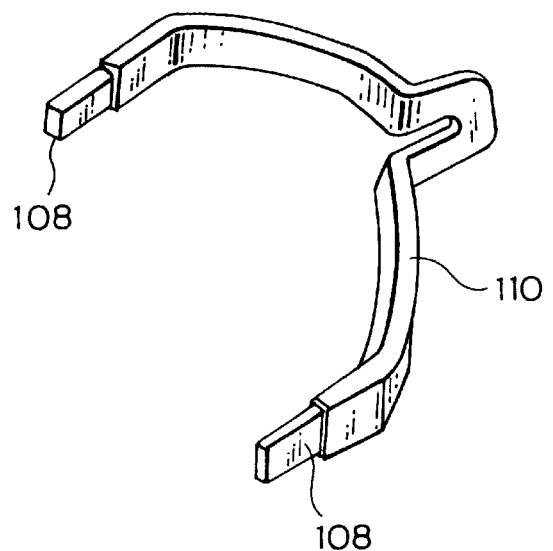
FIG. 33 is a perspective view of an equalizer portion comprised in the equalizer in FIG. 32.

FIG. 31 shows a commutator assembly for an electric motor according to Embodiment 11 of the present invention. In the equalizer 82 according to this embodiment, connector pins 81 passing through laminated printed circuit boards 83 pass through commutator segments 25 as well.

In this embodiment, the connector pins 81 pass through the commutator segments 25 in the axial direction, enabling suppression of the commutator segments 25 from jumping out in a radially outward direction due to centrifugal force when the rotor is rotating. Furthermore, the central portions of the commutator segments 25 can also be prevented from rising up from the commutator molded portion 10 when the rotor is rotating.

Moreover, each of the above embodiments has been explained with reference to an electric motor comprising a rotor disposed circumferentially outside and a stator disposed circumferentially inside, but the commutator assembly according to the present invention can also be applied to an electric motor comprising a rotor disposed circumferentially outside and a stator disposed circumferentially inside. Furthermore, the present invention can also be applied to the commutator assembly of a generator.

As explained above, a commutator assembly for a dynamo-electric machine according to one aspect of the present invention comprises a equalizer being provided with an printed circuit board comprising an insulating substrate and a connecting plate composed of a conducting film formed on the insulating substrate. Therefore, the size of the commutator assembly can be reduced. Furthermore, because the commutator and the equalizers are separate, the equalizers can be designed to have a suitable current capacity which is smaller than that of the commutator.

According to one form of the commutator assembly for a dynamo-electric machine, connecting projections protruding axially may be formed on one end surface of the commutator segments, and the connecting projections may pass through passage bores formed in the connecting plate and may be electrically connected thereto. Therefore, positioning of the printed circuit boards, and connection of the connecting plates and the commutator segments can be performed simply, with a reduced number of parts.

According to another form of the commutator assembly for a dynamo-electric machine, connecting pins for electrically connecting the connecting plate and the commutator segments extending axially beyond one end surface of the commutator segments may pass through passage bores formed in the connecting plate. Therefore, the connecting plates and the commutator segments are connected by connecting pins which are independent of the commutator segments, enabling the machining precision of the connecting pins to be improved and enabling the positioning of the printed circuit boards and the connection of the connecting plates and the commutator segments to be performed simply.

According to still another form of the commutator assembly for a dynamo-electric machine, the equalizer and the commutator may be integrated by resin. Therefore, mechanical strength can be improved and the number of steps needed to secure the equalizer can be reduced.

According to another form of the commutator assembly for a dynamo-electric machine, the equalizer may be formed by laminating a plurality of printed circuit boards. Therefor, the degree of freedom in the distribution pattern of the connecting plates can be increased, and the conducting area in each of the connecting plates can be increased.

According to still another form of the commutator assembly for a dynamo-electric machine, the connecting plate may comprise a plurality of equipotential conducting layers each connecting equipotential commutator segments being formed in one layer. Therefore, the equalizer can be made thinner.

According to another form of the commutator assembly for a dynamo-electric machine, the equalizer may be disposed in close proximity to the commutator at the opposite end from the rotor windings and may have outer diameter dimensions smaller than the outer diameter of the commutator. Therefore, the necessity to move the brushes radially outwards beyond the radius of the commutator when the rotor is inserted into the stator during the assembly process is removed, improving the production of the motor.

According to still another form of the commutator assembly for a dynamo-electric machine, the equalizer may be disposed in close proximity to the commutator at the same end as the rotor windings and may have outer diameter dimensions smaller than the outer diameter of the commutator. Therefore, wire can be wound onto the rotor core without obstruction to the winding process of an automatic winding machine, for example, and the axial length of the dynamo-electric machine is shortened.

According to another form of the commutator assembly for a dynamo-electric machine, the number K of connecting plates relative to a natural number n satisfying the expression $(n\beta+(n-1)\gamma) \leq (360/(2P)-\alpha)$, where P is the number of pairs of poles, Ns is the number of slots formed in said rotor core, $\alpha$ is the brush angle at the contact surface between the brushes and the commutator segments, $\beta$ is the commutator angle, and $\gamma$ is the angle between commutator segments, may be given by a whole number satisfying the expression $(Ns/(n\times P)) \leq K \leq (Ns/P)$. Therefore, the number of connecting plates in the equalizers can be reduced within a range which does not cause loss of equalizer efficacy, the axial length of the dynamo-electric machine can be shortened, and production costs can be reduced.

What is claimed is:

1. A dynamo-electric machine comprising:
   a rotor including a rotor core having slots and rotor windings wound in the slots;
   a commutator having a plurality of commutator segments arranged circumferentially upon said commutator;
   brushes contacting at least one pair of said commutator segments; and
   an equalizer connecting respective pairs of said commutator segments so that the pairs of said commutator segments have substantial identical electrical potentials, wherein said equalizer includes a printed circuit board comprising an insulating substrate and a connecting plate having a conducting film on said insulating substrate, said conducting film being directly electrically connected to at least one of the pairs of said commutator segments having substantially identical electrical potentials but not being directly connected to said rotor windings.

2. The dynamo-electric machine according to claim 1 including connecting projections on and protruding axially from end surfaces of said commutator segments, said connecting projections passing through passage bores in said connecting plate and being electrically connected to said connecting plate.

3. The dynamo-electric machine according to claim 1 including connecting pins extending into a recess in an end surface of said commutator segments, projecting from the end surface of said commutator segments, and passing through passage bores in said connecting plate, said connecting pins electrically connecting said connecting plate to said commutator segments.

4. The dynamo-electric machine according to claim 1 wherein said equalizer comprises a resin mounting said commutator to a shaft of said dynamo-electric machine and extending beyond said commutator so that said equalizer and said commutator are embedded in said resin.

5. The dynamo-electric machine according to claim 1 wherein said equalizer includes a plurality of laminated circuit boards.

6. The dynamo-electric machine according to claim 1 wherein said connecting plate comprises a plurality of equipotential conducting layers, each conducting layer connecting a pair of commutator segments having substantially identical electrical potentials consisting of a single layer.

7. The dynamo-electric machine according to claim 1 wherein said equalizer is disposed in close proximity to said commutator and remote from said rotor windings of said dynamo-electric machine, said equalizer having an outer diameter smaller than said commutator.

8. The dynamo-electric machine according to claim 1 wherein said equalizer is disposed in close proximity to said commutator, proximate said rotor windings of said dynamo-electric machine, said equalizer having an outer diameter smaller than said commutator.

9. The dynamo-electric machine according to claim 1 including at least K of said connecting plates wherein, $$(n\beta+(n-1)\gamma) \leq (360/(2P)-\alpha),$$

where
   n is an integer,

P is number of pairs of poles of said dynamo-electric machine,

Ns is number of the slots in said rotor core of said dynamo-electric machine,

α is a brush angle at a contact between said brushes and said commutator segments, β is commutator angle, and γ is the angle between commutator segments, and K is a whole number and satisfies $(Ns/(n \times P)) \leq K \leq (Ns/P)$.

* * * * *